United States Patent
Jones et al.

[11] Patent Number: 5,839,423
[45] Date of Patent: Nov. 24, 1998

[54] CUTTING DISC

[76] Inventors: Leon D. Jones; Kevin F. Baron, both of 1000 N. Del Norte Blvd., Oxnard, Calif. 93030

[21] Appl. No.: 816,306

[22] Filed: Mar. 13, 1997

[51] Int. Cl.⁶ .................................................. B28D 1/04
[52] U.S. Cl. ............................... 125/15; 83/835; 125/12; 125/13.01
[58] Field of Search ................................ 83/835; 125/15, 125/12, 13.01, 13.02, 18, 22, 28

[56] References Cited

U.S. PATENT DOCUMENTS

| | | | |
|---|---|---|---|
| 3,203,140 | 8/1965 | Hallez | 51/206 |
| 3,599,622 | 8/1971 | Baron | 125/15 |
| 4,240,315 | 12/1980 | Tuomaala | 83/848 |
| 4,516,560 | 5/1985 | Cruickshank et al. | 125/15 |
| 4,574,676 | 3/1986 | Jansen-Herfeld | 83/835 |
| 4,665,887 | 5/1987 | Shiga | 125/15 |
| 4,794,835 | 1/1989 | Fujiyoshi | 83/835 |
| 4,854,295 | 8/1989 | Sakarean | 125/15 |
| 5,392,759 | 2/1995 | Kwang | 125/15 |
| 5,438,900 | 8/1995 | Sundstrom | 83/835 |
| 5,555,788 | 9/1996 | Gakhar et al. | 83/835 |

FOREIGN PATENT DOCUMENTS 578625  1/1994  European Pat. Off. ................. 83/835

Primary Examiner—Timothy V. Eley
Assistant Examiner—Derris H. Banks
Attorney, Agent, or Firm—Jack C. Munro

[57] ABSTRACT

In a cutting disc which has a plurality of radial slots connecting with the peripheral edge of the disc, a transverse slot is located at the base of each radial slot. This transverse slot comprises a thin, arcuate slot positioned concavely to the peripheral edge of the disc. Each end of the transverse slot terminates in a hole. All corners formed between the transverse slot, radial slot and holes are smoothly contoured.

3 Claims, 1 Drawing Sheet

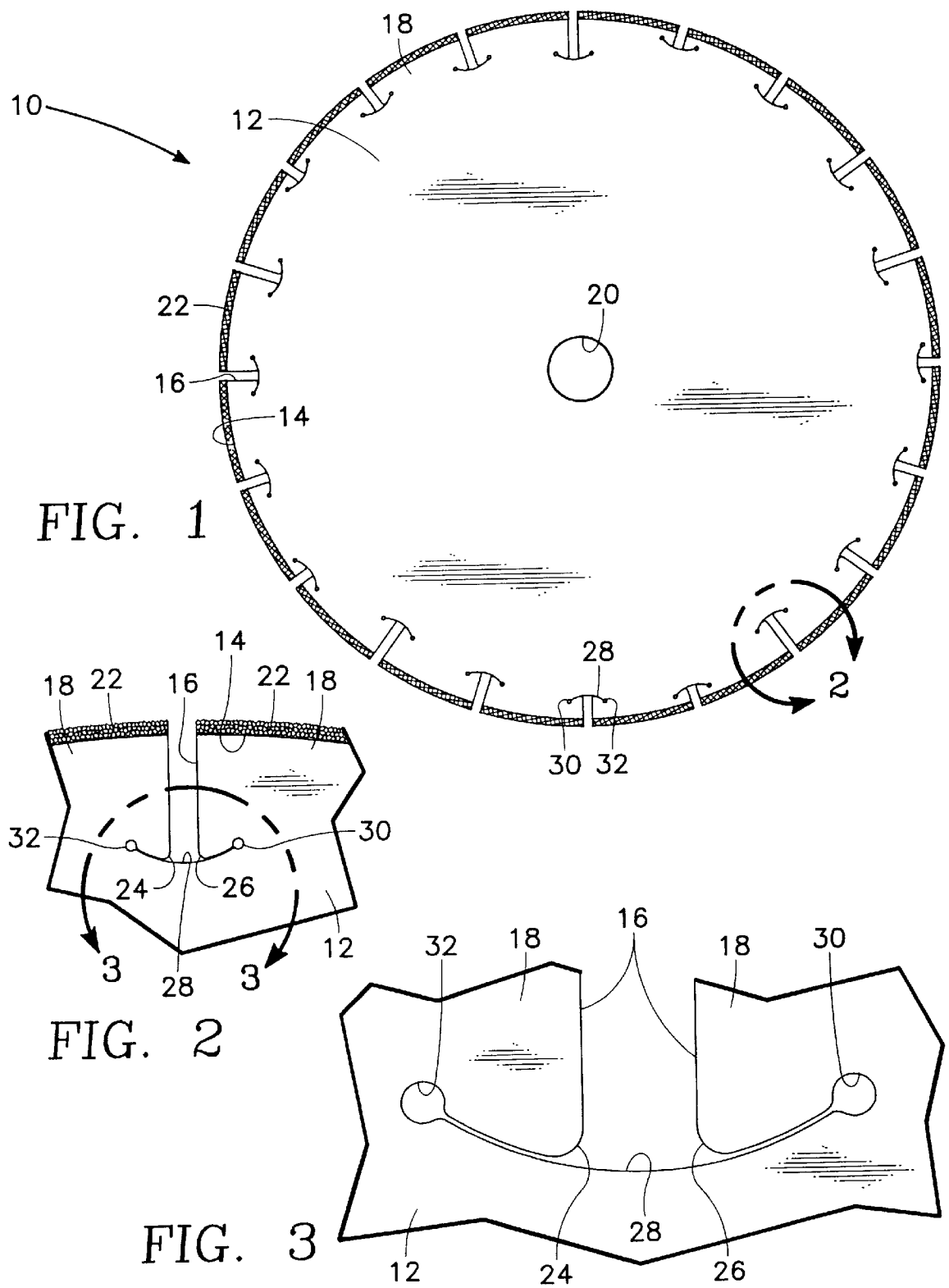

CUTTING DISC

BACKGROUND OF THE INVENTION

1) Field Of The Invention

The present invention relates to a cutting disc which is constructed of metal, such as stainless steel, and has a peripheral edge which is formed into a plurality of supporting segments by a plurality of spaced apart radial notches formed within the body of the cutting disc. The outer surface of each supporting segment has bonded thereto a cutting segment in block form of an abrasive material which normally includes diamonds as the primary cutting substance due to their hardness. The cutting disc may be used dry or used with a fluid coolant for cooling the cutting disc. The coolant is to be supplied to the area of cutting with this coolant being for the purpose of cooling the cutting disc and carrying swarf, principally loose rock-like material and coolant, away from the area of the cut being made.

2) Description Of The Prior Art

Diamond abrasive cutting discs have generally been classified into three distinct groups. The first group is the serrated or notched peripheral edge type of cutting disc which is old in the art and probably the earliest concept of the diamond cutting disc. This type of cutting disc is made by notching or slitting the peripheral edge of a steel disc and inserting into those notches or slits a paste of diamond grit and a holding material. The paste is then permitted to harden into a solid. This notched rim type of cutting disc has the merit of being virtually indestructible but cuts so poorly that it has no real acceptance for the cutting of exceedingly hard abrasive material such as cement, stone and asphalt. However, these notched rim types of cutting discs are made at the lowest price which makes such available for home hobby type of operations.

The second group of cutting discs consists of forming a continuous annulus of a compressed metallic powder containing diamond dust. This cutting disc is functionally superior to the notched rim type of cutting disc, but it too is unsatisfactory for the abrasive cutting operations common within industry because it has a disadvantage of being physically frail and liable to damage during usage due to the delicate nature of the bond between the annulus and the body of the disc. The use of this second cutting disc is confined in large part to precision operations such as the cutting of germanium, optical glass and other such precise uses.

The third, and most recent group of cutting discs, is the segmental type. This cutting disc is manufactured by forming a plurality of support segments (or lands) located between radial slots connecting with the peripheral edge of the cutting disc. On the outer surf ace of each support segment is mounted a cutting segment in the form of an abrasive block which commonly contains diamonds. These cutting segments are usually about two inches long and are brazed or welded to the peripheral edge of the steel body of the cutting disc. This type of segmented cutting disc has been accepted by the fields of usage that are most demanding on a cutting disc such as concrete sawing, masonry cutting and asphalt cutting. For such cutting applications, it is common to flush the cutting area continuously during the cutting operation with a fluid coolant in order to keep the blade as cool as possible and to flush from the cutting area loose rock-like material, spent abrasive and the like, all of which in combination with the coolant described are generally referred to as swarf.

Because cutting discs are utilized to cut hard and abrasive materials, it is common that the stresses created within the cutting discs result in cracks and actual loss of pieces of the cutting disc. One of the most common areas for breakage is at the inner end of one of the radial slots. To minimize the possibility of cracking at the inner end of a radial slot, it is common to form a hole, frequently ref erred to as a keyhole, at the end of each slot. It is the purpose of the hole to decrease the possibility of any cracking occurring within the body of the cutting disc. Besides keyholes, it is known to utilize numerous other configurations at the inner end of each radial slot which are believed to be superior in minimizing the possibility of cracking of the cutting disc.

Also, undercutting is a problem with each cutting disc. Undercutting is the forming of a groove within the body of the cutting disc at the radial inner end of the slots. If left unchecked, this groove will eventually result in failure of the cutting disc. It would be desirable to construct the cutting disc in such a manner so as to not concentrate the undercut at the inner end of the radial slots.

SUMMARY OF THE INVENTION

This invention relates to a cutting disc which is constructed of a thin metallic body having a diameter anywhere from a few inches to several feet. The cutting disc has a peripheral edge, and within that peripheral edge is formed a series of radial slots. These radial slots are evenly spaced apart. A common number of such radial slots would be about twenty, but it is to be understood that the number of slots will vary according to the diameter of the cutting disc with more slots being used in a larger diameter disc and less slots being used in a smaller diameter disc. Between each directly adjacent pair of radial slots is formed a support segment or land. On the outer edge of each support segment is bonded a cutting segment. The cutting segment comprises a block of abrasive material which generally includes diamonds. Each support segment is generally about an inch and a half to two inches in length. The inner end of each radial slot connects with a transverse slot which is of a substantially lesser width than the width of the radial slot. The transverse slot is arcuate with the transverse slot being concave relative to the peripheral edge of the cutting disc. Each end of the transverse slot connects to a hole formed within the body with there being a separate hole for each end of the transverse slot. The corners of the radial slot that connect with the transverse slot are smoothly contoured. Several different lengths of radial slots are incorporated within the body in order to minimize the possibility of undercutting.

The primary objective of the present invention is to construct a cutting disc that minimizes the possibility of cracking within the cutting disc even after extended usage of the cutting disc.

Another objective of the present invention is to construct a cutting disc which diminishes the effect of undercutting.

BRIEF DESCRIPTION OF THE DRAWING

FIG. 1 shows a front view of the cutting disc constructed in accordance with this invention;

FIG. 2 is an enlarged view of one of the radial notches incorporated within the cutting disc taken along line 2—2 of FIGS. 1; and FIG. 3 is an enlarged view of the inner end of one of the radial notches incorporated in the cutting disc of the present invention taken along line 3—3 of FIG. 2.

DETAILED DESCRIPTION OF THE PREFERRED EMBODIMENT

Referring particularly to the drawing, there is shown the cutting disc 10 of this invention. The body 12 of the cutting disc 10 is to be formed of planer sheet metal, with steel generally being preferred. The body 12 has a peripheral edge 14. Included within the peripheral edge 14 is a plurality of radial slots 16. The radial slots 16 are generally of equal width, with a common width being approximately one-eighth of an inch. However, it is considered within the scope of this invention that the width of the radial slots 16 could be increased or decreased. The radial slots 16 are located in an evenly spaced apart arrangement. The portion of the body 12 that is located between a directly adjacent pair of radial slots is defined as a support segment 18. Land is also used to define the support segment 18. A typical number for the radial slots 16 would be about twenty thereby forming twenty in number of the support segments 18.

It is to be noted that referring particularly to FIG. 1 it is desirable to vary the length of the radial slots 16. Some of the radial slots 16 are a half inch in length while others are five-eighths inch in length, three-quarters and still others are seven-eighths in length. Typical width of a radial slot would be one-eighth (0.125) of an inch. In using the cutting disc 10, there is a tendency to wear a groove within the body 12 directly at the inner end of each of the radial slots 16. If all the slots 16 were the same length, a single groove would be created which would result in premature failure of the cutting disc 10. To eliminate this possibility, by using radial slots 16 of various lengths, a plurality of grooves, rather than a single groove, is formed within the body 12. The forming of these grooves is referred to as undercutting. By forming a plurality of grooves rather than a single groove, a single deep cut groove is avoided and the structural integrity of the body 12 is maintained over an extended period of time thereby increasing the durability of the cutting disc 10. The body 12 includes a center hole 20 which is to be used for mounting and locking the cutting disc 10 onto a motorized, rotating, axially extending shaft (not shown).

A cutting segment 22 is to be fixedly secured by brazing or welding onto the peripheral edge 14 with there being a separate cutting segment for each support segment. The length of the cutting segment 22 is to be identical to the length of the support segment 18. The cutting segment 22 is to comprise a block manufactured of a mass of diamond material impregnated within a bonding substance. The use of such cutting segments 22 is deemed to be conventional.

It is to be noted that each of the radial slots 16, though of varying length, are all of the same configuration. The inner end of each radial slot 16 is formed into smoothly contoured or rounded corners 24 and 26. It is important that the corners 24 and 26 be rounded to minimize the possibility of creating any cracks in that area. If the corners 24 and 26 were sharp pointed, there is a much greater likelihood of a crack being created.

The inner end of each slot 16 connects with a transverse slot 28. The transverse slot 28 is arcuate and actually forms the segment of a circle. A common length for each of the transverse slots 28 would be about one inch. The transverse slot 28 for each radial slot 16 is centrally located. The transverse slot 28 is located concave relative to the peripheral edge 14. The amount of curvature of the transverse slot 28 is variable according to the diameter of the cutting disc 10. Generally, the radius of the arc of the transverse slot 28 will be shorter for a smaller diameter cutting disc 10 and larger for a larger diameter cutting disc 10. The width for the transverse slot 28 is to be as narrow as possible with a common width being about 0.007 of an inch.

One end of the transverse slot 28 terminates in a hole 30 with the opposite end of the transverse slot 28 terminating in a hole 32. The holes 30 and 32 are of the same size. The edges of the transverse slot 28 that connect with the holes 30 and 32 are also rounded again minimizing the possibility of a sharp point being created which could encourage the creation of cracks. The reason the holes 30 and 32 are located within the body 12 is to again minimize the creation of cracks in the body 12. The diameters of the holes 30 and 32 will generally be in the range of about one-quarter inch.

One of the functions of the radial slots 16 is to allow for expansion and contraction due to the creation of heat during usage of cutting disc 10. Also, the slots 16 function to allow for the swarf to escape from the cutting area. Additionally, the radial slots 16 function to allow the slurry to penetrate around each of the cutting segments 22 which functions to better cool the cutting segments 22. Failure of cutting discs 10 due to cracking results in their limited life, escalating operational costs by millions of dollars annually for users within the United States.

What is claimed is:

1. A cutting disc for cutting asphalt, concrete and stone, said cutting disc comprising:

a circular shaped body having a peripheral edge;

a plurality of radial slots formed within said body, said radial slots being spaced apart, said body defining a support segment between each directly adjacent pair of said radial slots, each said radial slot having an open outer end connecting with said peripheral edge, each said radial slot having a closed inner end, a transverse slot formed within said body and located at said closed inner end, there being a separate said transverse slot for each said radial slot, said transverse slot being less in width than said radial slot, said transverse slot being arcuate said radial slots forming a pair of corners at said inner end with said corners connecting with said transverse slot, each said corner being rounded; and a cutting segment fixedly mounted on each said support segment at said peripheral edge, there being a separate said cutting segment for each said support segment, each said cutting segment comprising an abrasive block.

2. A cutting disc for cutting asphalt, concrete and stone, said cutting disc comprising:

a circular shaped body having a peripheral edge;

a plurality of radial slots formed within said body, said radial slots being spaced apart, said body defining a support segment between each directly adjacent pair of said radial slots, each said radial slot having an open outer end connecting with said peripheral edge, each said radial slot having a closed inner end, a transverse slot formed within said body and located at said closed inner end, there being a separate said transverse slot for each said radial slot, said transverse slot being less in width than said radial slot, said transverse slot being arcuate, said radial slots forming a pair of corners at said inner end with said corners connecting with said transverse slot, each said corner being rounded;

a cutting segment fixedly mounted on each said support segment at said peripheral edge, there being a separate said cutting segment for each said support segment, each said cutting segment comprising an abrasive block; and each said transverse slot being concave relative to said peripheral edge.

3. A cutting disc for cutting asphalt, concrete and stone, said cutting disc comprising:

a circular shaped body having a peripheral edge;

a plurality of radial slots formed within said body; said radial slots being spaced apart, said body defining a support segment between each directly adjacent pair of said radial slots, each said radial slot having an open outer end connecting with said peripheral edge, each said radial slot having a closed inner end, a transverse slot formed within said body and located at said closed inner end, there being a separate said transverse slot for each said radial slot, said transverse slot being less in width than said radial slot, said transverse slot being arcuate said radial slots forming a pair of corners at said inner end with said corners connecting with said transverse slot, each said corner being rounded;

a cutting segment fixedly mounted on each said support segment at said peripheral edge, there being a separate said cutting segment for each said support segment, each said cutting segment comprising an abrasive block; and each said radial slot having a width of approximately 0.125 inches, each said transverse slot having a width of approximately 0.007 inches.

\* \* \* \* \*